United States Patent [19]

Chapman et al.

[11] Patent Number: 5,442,738
[45] Date of Patent: Aug. 15, 1995

[54] COMPUTER DISPLAY REPRESENTING STRUCTURE

[75] Inventors: William Chapman, Scottsdale; Jeffrey A. Robinson, Glendale, both of Ariz.

[73] Assignee: Motorola, Inc., Schaumburg, Ill.

[21] Appl. No.: 160,765

[22] Filed: Dec. 3, 1993

[51] Int. Cl.$^6$ .............................................. G06F 3/14
[52] U.S. Cl. ................................................. 395/135
[58] Field of Search ............... 395/155, 161, 133, 135, 395/158, 159, 160, 156, 157; 345/113, 114, 119, 120

[56] References Cited

U.S. PATENT DOCUMENTS

| | | | |
|---|---|---|---|
| 5,287,449 | 2/1994 | Kojima | 395/161 |
| 5,297,248 | 3/1994 | Clark | 395/155 |

*Primary Examiner*—Phu K. Nguyen
*Attorney, Agent, or Firm*—Robert D. Atkins

[57] ABSTRACT

A computer displays nested windows representing the structure of logical and arithmetic related objects. The objects have a logical description that defines relationships between the objects including a combination of significance and precedence. The description is parsed to identify the significance and precedence of each object. Delimiters are extracted which define the significance and precedence. The relationships are displayed with nested windows on the computer display as defined by the delimiters where the relationships having a higher order of precedence are arranged in windows on top of other windows that represent lower order or precedence. The objects and relationships may be edited based on the computer display

18 Claims, 2 Drawing Sheets

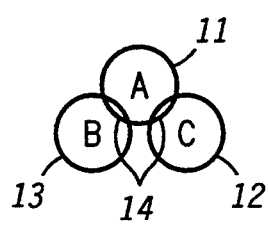
FIG. 1
-PRIOR ART-
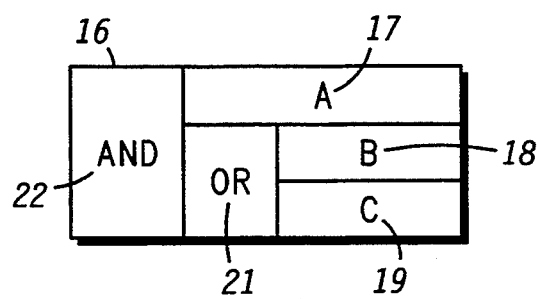
FIG. 2
-PRIOR ART-
FIG. 3
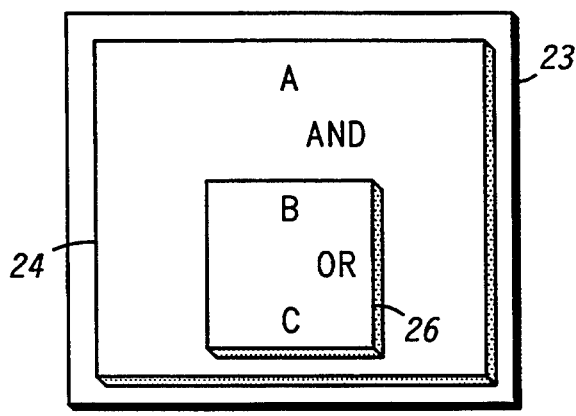
FIG. 4
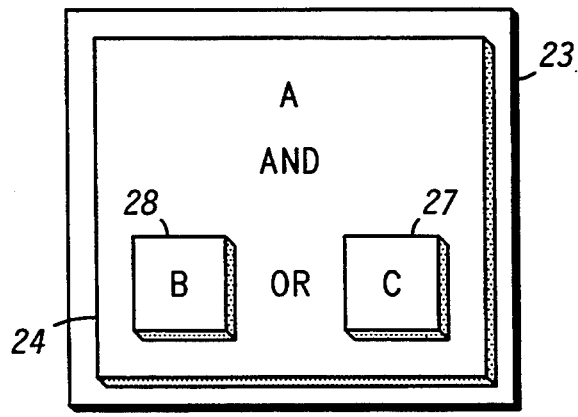

COMPUTER DISPLAY REPRESENTING STRUCTURE

BACKGROUND OF THE INVENTION

The present invention relates, in general, to a computer display and method for presenting certain information, and more particularly to a computer display and method for the presentation of structure.

According to the prior art structural expressions are represented by textual methods. Such representations are difficult to read because the hierarchical structure, significance, and precedence of elements in the expressions are modeled through the use of textual delimiters such as parentheses. For example the expression "A AND B OR C" requires parentheses or some similar delimiter to resolve the ambiguity as to whether the expression "A AND B" or the expression "B OR C" is to be evaluated first. These delimiters are not obvious to the eye and as a result can make the expression difficult to read or understand.

There is a need for a computer display which represents structure in a way which is visually easy to comprehend and is consistent with computer windowing styles and standards. The method should be simpler and less syntax sensitive than textual algebraic notations. Ideally the display should be user friendly and easy to edit and read.

BRIEF DESCRIPTION OF THE DRAWINGS

FIG. 1 illustrates a structural diagram according to the prior art;

FIG. 2 illustrates a second structural diagram according to the prior art;

FIG. 3 illustrates a computer display which represents a structural relationship in accordance with the present invention;

FIG. 4 shows a computer display which is an alternative embodiment;

DETAILED DESCRIPTION OF THE DRAWINGS

Figure 5:
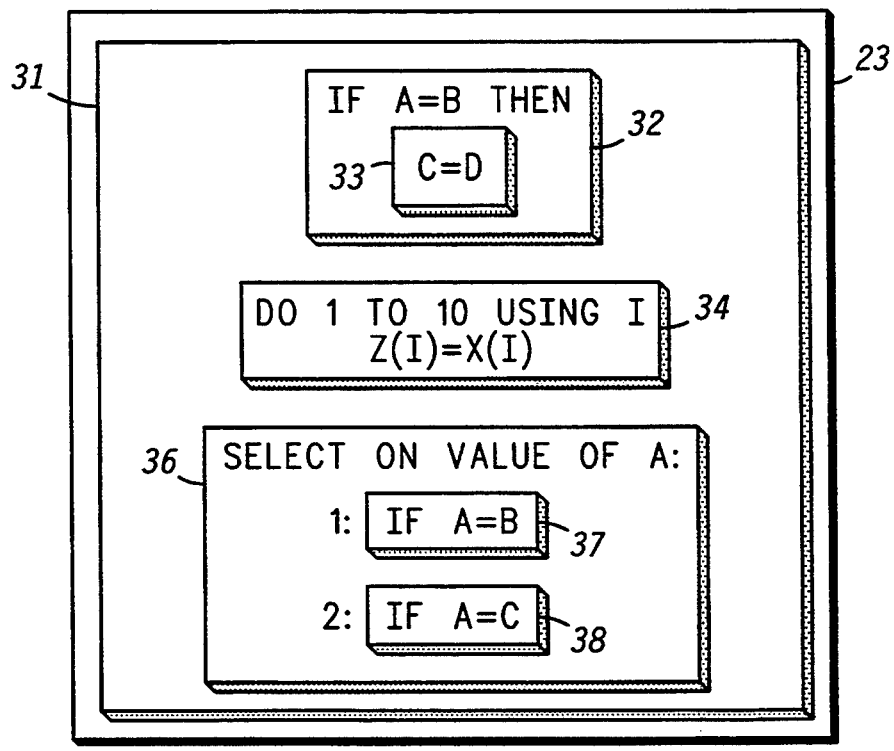
FIG. 5 shows a computer display which represents a variety of structures.

FIG. 1 illustrates a structural diagram according to the prior art which presents structure and can be adapted to a computer display. FIG. 1 represents a form of a VENN diagram in which each entity is represented by a circle. Entity "A" is represented by a circle 11, entity "B" is represented by a circle 13, and entity "C" is represented by a circle 12. Area 14 represents the overlap between entities "A" and "B" and entities "A" and "C". By convention area 14 can be used to represent an "AND" or an "OR" relationship between entities "A" and "B" or "A" and "C" without the complicating presence of textual delimiters. Differentiating between an "AND" or an "OR" relationship can be accomplished by a variety of conventional ways including color, shading, texture, or circles being one in front of another. This use of VENN diagrams, however, is severely limited as the complexity of the expressions illustrated increases. Mapping of a complex nested relationship can become difficult or impossible to represent using these set theory representations alone. Arithmetic expressions cannot be represented in this manner at all.

FIG. 2 illustrates a Nassi-Schneiderman chart which is a form of structural diagram according to the prior art and which can adapted to a computer display. This method can be extended to represent nested logical control system flow structures and the like. Indeed this is one of the most popular uses for this method. The example shown in FIG. 2 illustrates the logical expression "A AND (B OR C)". In this example, entities 17, 18, and 19 are labeled "A", and "C" respectively. These entities are related by a logical AND 22, and a logical OR 21. The diagram is enclosed in a rectangle 16. Nassi-Schneiderman charts can be used to represent logical relationships in this way, but this method also becomes restrictive and unwieldy as the complexity of an expression increases. As more nested relationships are added, the physical size of this type of representation grows dramatically. In addition, the utility of this type of model is also limited to purely logical expressions, lacking mechanisms to show such relationships as decision branches, containment or commonality.

Another method of representing structure according to the prior art is with flow charts. Typically a flow chart comprises a series of symbols joined by arrows which indicate the logical flow of instructions. Special symbols are reserved for decision branches, data storage, and functional blocks. Flow charts can also be used to represent control flow structures, but are limited in that they cannot be used to represent logical or mathematical expressions.

FIG. 3 shows a computer display 23 which represents a structural relationship in accordance with the present invention. This embodiment utilizes nested windows within which individual elements of an expression are listed. This representation can be applied to logical expressions, mathematical expressions, and control flow structures as well. In this example entities 24 represent a logical "AND" of an item labeled "A" with an entity 26. Entity 26 represents the "OR" of items "B" and "C". Thus the display represents the logical expression "A AND (B OR C)". Thus display of those elements in a single window is used to show that they share an "AND" or an "OR" relationship with one another.

The method used to present the structure of this example starts with the textual description of the objects, and their relationships which include a combination of significance and precedence. The description is parsed to identify the significance and precedence of each object by extracting the delimiters which define the significance and precedence in the textual representation. In this example the significance is a logical relationship, "AND" and "OR". The precedence is denoted by the parentheses "(B OR C)", indicating that the quantity "B OR C" is evaluated before any other quantities in the expression. The relationships are displayed by use of nested windows on the computer display in accordance with their precedence and significance as defined by the extracted delimiters. The delimiters are used to generate the appropriate symbols or other differentiation between each window in accordance with the convention established by the user for the display. The objects and relationships may now be edited by use of a pointing device based on the computer display to identify the object or relationship which is to be edited.

The complexity of the expression is handled by the repeated nesting of windows, that is, windows being contained within other windows. As layers over these windows are built, the elements of the expression are represented and nested in a manner that corresponds to the nesting of textual delimiters in the textual form of the expression. However, this method nests and associates the expression elements in a simpler graphical form. Likewise arithmetic or mathematical expressions can also be represented using this nested window method to simplify the textual method of nesting.

Differentiation between an "AND" or an "OR" relationship is accomplished by any of a variety of conventions such as color, shading, texture, or entities being placed in front of one another. Use of different highlights or colors for different layers can also be used with this style to clarify the types of relationships within individual window layers. For example, the color blue would represent AND relationships in a first layer window, green would represent OR relationship for another layer, and red would represent a NOT relationship for a third layer. Note that all logical expressions can be reduced to the three AND, OR, and NOT relationships. This graphical emphasis permits the visual differentiation of different layers or levels of structural nesting within the represented expression or structure. The differentiation between the windows in this way models the look and feel of standard GUI (Graphical User Interface) styles. Nesting of windows is a method which is compatible with a "window, icon, menu, and pointer, graphical user interface" style which is often abbreviated as a WIMP GUI style.

FIG. 4 shows computer display 23 illustrating an alternative embodiment representing the structural relationship shown in FIG. 3. An entity 24 shows item "A" with an "AND" relationship to entities 27 and 28. In addition entity 24 shows the "OR" relationship between entities 27 and 28. Entities 27 and 28 contain single items "C" and "B" respectively. For simplicity only a single item is shown within entities 27 and 28, however, more complex relationships or further nested entities could also be included within either or both of entities 27 and 28.

FIG. 5 shows computer display 23 illustrating a variety of structures, including arithmetic expressions, control flow expressions and a nested control block. These examples may be readily extended by those of skill in the art to include other forms of variable expressions, complex expressions, and nested conditional expressions by combining the examples shown. An entity 31 shows that a relationship exists between entities 32, 34, and 36. In this example the relationship shown is one of some commonalty which would otherwise be defined only by convention. Entity 32 represents the relationship "IF A=B THEN" and the object of the "IF" statement is entity 33, which contains the expression "C=D". Entity 34 contains an instruction statement comprising the loop "DO 1 TO 10 USING I Z(I)=X(I)". This instruction is contained as an entity without requiring punctuation or termination. Entity 36 illustrates another form of instruction that is a selection based on the value of a variable. Entity 36 contains the instruction "SELECT ON VALUE OF A", the first selected entity is entity 37 which contains an instruction "IF A=B" . . . , and entity 38 which contains an instruction "IF A=C". . . For clarity further statements which would otherwise be included in entities 37 and 38 are not shown. However those statements would also be clearly related by the graphical cues provided by the display.

Figure 6:
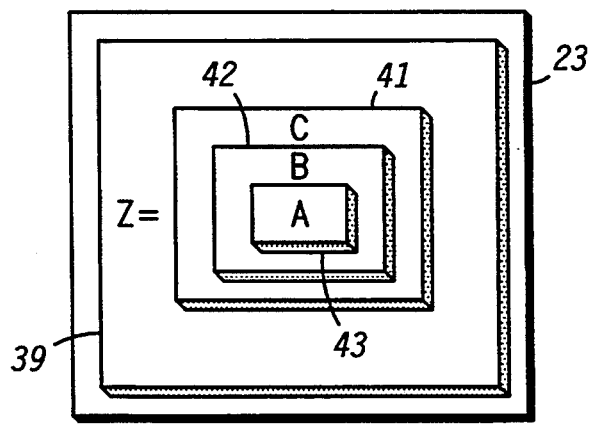
FIG. 6 shows an alternative computer display which illustrates an example of a relationship of variable association.

FIG. 6 shows computer display 23 illustrating variable association. FIG. 6 depicts the graphical causing of an assignment statement, entity 39. Many programming languages implement the concept of deferred addressing or indirection. These languages utilize pointer variables which contain the address of another variable. Multiple indirections, that is pointers to pointers, are represented by an associated number of graphical elevations, entities 41 and 42 in this figure. Thus in order to determine the value to be assigned to variable "Z" variable "C" contained in entity 41 must be inspected. Entity 41 is a pointer variable which points to an entity 42 or variable "B". Likewise entity 42 is a pointer variable which points to an entity 43 or variable "A". In this example, entity 43 is a terminal entity which contains the actual value which is to be entered into "Z". The graphical container for entities 41, 42, and 43 can be delimited by color, shading or other techniques to delineate a terminal value rather than a pointer variable. This method may be extended to differentiate between each of the many types of quantities and structures, including user defined types, which are commonly found in a programming language. This graphical depiction of a variable's level of indirection and type is helpful for debugging and editing of computer programs or logic statements.

By now it should be clear that the present invention provides a computer display which represents structure in a way which is visually easy to comprehend. The computer display allows representation of complex mathematical, arithmetic, or logical expressions in a simple graphical style. The structure is consistent with computer windowing styles and standards. In addition the method is simpler and less syntax sensitive than textual algebraic notations. A graphical representation of the associations and relationships of expression elements removes the textual components of the expression syntax. Only the content or the logical or arithmetic expressions themselves remain. Finally, the display is user friendly and easy to edit and read.

We claim:

1. A computer implemented method of presenting logical structures on a computer display screen, comprising the steps of:
   providing a logical description of a plurality of objects that defines relationships between the plurality of objects;
   parsing the logical description to identify the relationships between the plurality of objects;
   extracting a plurality of delimiters which define the relationships between the plurality of objects; and
   displaying the relationships with nested windows on the computer display as defined by the delimiters where the relationships having a higher order of precedence are arranged in windows on top of other windows that represent lower order of precedence.

2. The method of claim 1 wherein the objects comprise a plurality of logical and arithmetic expressions.

3. The method of claim 2 wherein the windows include a first window type for AND operators, a second window type for OR operators, and a third window type for NOT operators.

4. The method of claim 1 wherein the objects comprise a plurality of variable expressions.

5. The method of claim 1 wherein the objects comprise a plurality of complex expressions.

6. The method of claim 1 wherein the objects comprise a plurality of control flow expressions.

7. The method of claim 6 wherein the control flow expressions include a nested conditional expression, a loop and a control block.

8. The method of claim 6 wherein the form of graphical emphasis comprises highlighting of a desired window.

9. The method of claim 6 wherein the form of graphical emphasis comprises projection of a desired window using visual cues.

10. The method of claim 6 wherein the form of graphical emphasis comprises variations in color between two windows.

11. The method of claim 1 further comprising:
emphasizing the relationships between associated objects using at least one form of graphical emphasis.

12. The method of claim 1 further comprising:
grouping of objects by common associations.

13. The method of claim 1 wherein the relationships include hierarchical relationships.

14. The method of claim 1 wherein the relationships include significance relationships.

15. The method of claim 1 wherein the relationships include precedence relationships.

16. The method of claim 1 wherein the relationships include deferred variable associations.

17. The method of claim 1 wherein the levels of nested windows for logical and arithmetic expressions corresponds to the number of parenthetical nestings in the written expression, 18. The method of claim 1 further including the step of editing the objects and relationships based on the computer display.

* * * * *